United States Patent [19]
Gliemeroth et al.

[11] 3,954,487
[45] May 4, 1976

[54] CHEMICALLY HARDENED SPECTACLE CROWN GLASS

[75] Inventors: Georg Gliemeroth, Mainz; Lothar Meckel, Oestrich, both of Germany

[73] Assignee: Jenaer Glaswerk Schott & Gen., Mainz, Germany

[22] Filed: Oct. 15, 1974

[21] Appl. No.: 515,000

Related U.S. Application Data

[63] Continuation of Ser. No. 330,008, Feb. 6, 1973, abandoned.

[30] Foreign Application Priority Data

Feb. 8, 1972 Germany............................ 2205844

[52] U.S. Cl.................................. 106/54; 106/53; 106/47 Q; 65/30 E
[51] Int. Cl.².......................................... C03C 3/04
[58] Field of Search ............... 106/47 Q, 52, 53, 54; 65/30

[56] References Cited
UNITED STATES PATENTS

| | | | |
|---|---|---|---|
| 3,301,649 | 1/1967 | Marusak .................... | 65/30 |
| 3,357,876 | 12/1967 | Rinehart ................... | 65/30 X |
| 3,524,737 | 8/1970 | Doyle....................... | 65/30 |
| 3,740,242 | 6/1973 | Faulstich................... | 65/30 X |
| 3,772,135 | 11/1973 | Hara ........................ | 65/30 X |
| 3,790,260 | 2/1974 | Boyd........................ | 65/30 X |

FOREIGN PATENTS OR APPLICATIONS 812,576    9/1956    United Kingdom.................. 106/54

OTHER PUBLICATIONS

Am. Ceramic Soc. Bull., Vol. 49, No. 11, Nov. 1970, pp. 974–977.

*Primary Examiner*—Winston A. Douglas
*Assistant Examiner*—John F. Niebling
*Attorney, Agent, or Firm*—Millen, Raptes & White

[57] ABSTRACT

A chemically hardened optical crown glass having a refractive index $n_d$ of 1.5225–1,5235, a thermal expansion coefficient in the temperature range between 20° and 300° C. of $90 \times 10^{-7}$ to $100 \times 10^{-7}$/°C., a dispersion $\gamma d$ of 54-60, a softening temperature of 690°–750° C., and a transformation temperature of 480°–550° C., produced by melting, shaping and cooling a batch consisting essentially of the following composition in parts by weight based on 100 parts of total composition: $SiO_2$, 50.5–61.0; $Al_2O_3$, 7.0–17.5; $B_2O_3$, 2.0–6.1; $Li_2O$, 0–1.0; $Na_2O$, 12.0–15.0; $K_2O$, 2.5–3.5; CaO, 0–4.1; BaO, 0–0.3; ZnO, 5.0–10.0; PbO, 0–0.5; $TiO_2$, 0.1–0.9; $As_2O_3$, 0–0.5; and $Sb_2O_3$, 0–1.0; and thereafter subjected to an ion exchange in which large alkali metal ions are diffused into the glass in exchange for smaller alkali metal ions at a temperature below the upper cooling temperature which corresponds to a viscosity of $10^{13}$ poises.

10 Claims, No Drawings

CHEMICALLY HARDENED SPECTACLE CROWN GLASS

This is a continuation of application Ser. No. 330,008 filed Feb. 6, 1973, now abandoned.

BACKGROUND OF THE INVENTION

This invention relates to chemically hardened optical crown glass.

Both the thermal and the chemical hardening of glasses are known. For increasing the tensile and impact strength of optical quality crown glasses used as eyeglasses, however, only thermal hardening processes have heretofore been used, because conventional eyeglasses due to their chemical composition were not suited to be chemically strengthened to such an extent as to achieve satisfactory results in drop ball testing.

The thermal hardening does however involve disadvantages. This hardening process is unsuitable for a glass blank and has to be carried out on a glass which has already been ground, polished and rimmed. For thermal hardening, it is necessary to heat the glasses to high temperatures and then to quench them. This heating passes into transformation temperature ranges about 550° C. in which the glass is already deformed after several minutes. As a result, there is the danger that the surface curves which are carefully produced and often are specially calculated to correct for visual errors become distorted.

Another disadvantage of the thermal hardening is the parabolic distribution of tension which is thereby achieved in the cross-section of a thermally hardened optical glass lens. This is always noticeable in a displeasing manner when the corrective glass lenses have a non-uniform thickness. With the hardening, a stress imbalance is produced so that it is difficult to accurately determine what stressing the thermally hardened glass will actually withstand in subsequent use.

An additional disadvantage of thermal hardening is that it is restricted to lenses having a minimum thickness of about 2 mm. This means that a heavier spectacle glass is often required, particularly with corrective glasses having a negative diopter since it is necessary to have a minimum central thickness in the thinnest part of the glass.

OBJECTS OF THE INVENTION

Accordingly, it is an object of this invention to provide chemically hardened optical crown glass.

Another object of this invention is to provide a simplified process for hardening optical crown glass.

A further object of this invention is to provide optical crown glass severalfold stronger than comparable thermally hardened optical crown glass.

An additional object of this invention is to provide optical crown glass spectacle lenses and lens blanks of improved dimensional stability and ball-dropping strength.

Upon further study of the specification and appended claims, further objects and advantages of this invention will become apparent to those skilled in the art.

SUMMARY OF THE INVENTION

Briefly, the above and other objects are attained in one aspect of this invention by providing a chemically hardened optical crown glass having a refractive index $n_d$ of 1.5225 – 1.5235, a thermal expansion coefficient in the temperature range between 20° C. and 300° C. of $90 \times 10^{-7}$ to $100 \times 10^{-7}$° C., a dispersion $\gamma d$ of 54–60, a softening temperature of 690°–750° C., and a transformation temperature of 480°–550° C., produced by melting, shaping and cooling a batch consisting of essentially the following composition in parts by weight based on 100 parts of the total composition:

| | | |
|---|---|---|
| $SiO_2$ | — | 50.5 – 61.0 |
| $Al_2O_3$ | — | 7.0 – 17.5 |
| $B_2O_3$ | — | 2.0 – 6.1 |
| $Li_2O$ | — | 0 – 1.0 |
| $Na_2O$ | — | 12.0 – 15.0 |
| $K_2O$ | — | 2.5 – 3.5 |
| CaO | — | 0 – 4.1 |
| BaO | — | 0 – 0.3 |
| ZnO | — | 5.0 – 10.0 |
| PbO | — | 0 – 0.5 |
| $TiO_2$ | — | 0.1 – 0.9 |
| $As_2O_3$ | — | 0 – 0.5 |
| $Sb_2O_3$ | — | 0 – 1.0 |

It is thereafter subjected to an ion exchange in which large alkali metal ions are diffused into the glass in exchange for smaller alkali metal ions at a temperature below the upper cooling temperature which corresponds to a viscosity of $10^{13}$ poises.

The optical crown glasses to be chemically strengthened according to the invention are manufactured as is common practice in the art of making ophthalmic crown glass; i.e. melting the batch at about 1500° C, firing at about 1520° C, cooling to achieve shaping viscosity of $4 \times 10^4$ poises, shaping and cooling to room temperature. The properties of these glasses at this stage are similar to those of any ophthalmic crown glass, such as Type S1 of SCHOTT OPTICAL INC., Duryea, Pa., including the flexural tensile strength which is about 800 kp/cm².

DETAILED DISCUSSION

The present invention provides a spectacle glass which has been strengthened by other than thermal hardening, whereby more especially a lower hardening temperature below the transformation temperature of the glass, e.g., 340°–550° C., and preferably in the temperature range of 450°–370° C. preserves the true shape of the glass element.

It has now been found that certain optical crown glasses can be hardened chemically by ion exchange below the transformation temperature. In this way, small alkali ions which are originally in the glass are replaced by larger alkali metal ions which diffuse thereinto.

With this chemical hardening procedure, a two to fourfold increase in structural strength is achieved, as compared with thermal hardening of the same glass.

A sharper tension profile is obtained according to the invention having a U-form, not a parabola form as results from thermal hardening, which makes possible the chemical hardening of eyeglasses of non-uniform thickness with more constant results than can be obtained by thermal hardening.

The compressive stress level in and near the glass surface of spectacle glasses produced according to this invention lies above 4000 kp/cm$^{-2}$. This stress must therefore not be once exceeded before a break occurs. This compressive stress occurs in a layer thickness of at least 100 μm, so that the effect of any indentation or notch positions which exist or are formed in use is compensated for in every case, thereby greatly increasing the structural strength of the glass.

As a result, the following advantages are produced for chemically hardened spectacle glasses:
1. Improved dimensional stability with the hardening; connected with this:
2. Simplification of the hardening process.
3. Considerably higher ball-dropping strength, e.g., according to DIN 4646 (higher than for comparable glass which is hardened thermally).
4. Thinner and lighter spectacle glasses which are cosmetically more pleasing.

The fact that spectacle glasses can be chemically hardened is surprising. It was not heretofore possible for the optical crown glasses used commercially in spectacles to be chemically hardened to produce advantages as compared with the thermally hardened glasses because with the thermally hardened glasses because the composition of conventional glasses does not permit an ion exchange which would give compression layers of sufficient thickness and stress so as to achieve high flexural tensile strength of more than 3000 kg/cm$^2$.

On the other hand, glasses already known to be suitable for chemical hardening cannot be used as spectacle crown glass, since a whole series of standards exists for a spectacle quality optical crown glass which is not satisfied by these known chemically hardened glasses:

Optically correct position: refractive index ($n_d$=1.3230)

Thermal expansion coefficient at 20°–300° C. in the range of 95–98 × 10$^{-7}$/° C Transformation temperature according to DIN between 520°–545° C.

Softening temperature (10$^{7.6}$ poises) between about 700° and 750° C.

Fusion tension as compared with the close portion glasses usual today, e.g., BaF51 (Schott), smaller than ± 50 nmem$^{-1}$.

Chemical resistivity equivalent to that which exists today with the usual spectacle glass distance portions.

Devitrification strength sufficiently high to permit the automatic production of spectacle glass blanks.

It was found that a glass composition within a range which differs considerably from the heretofore usual spectacle glass compositions can be chemically hardened for times of between 15 minutes and 16 hours at temperatures below the transformation temperature, to form a hardened glass which fulfills all of the previously described requirements set for a spectacle glass.

This glass is characterized by having the following composition of oxides given in parts by weight per 100 parts of the composition:

|  | Useful |  |  | Preferred |  |  |
|---|---|---|---|---|---|---|
| SiO$_2$ | 50.5 | – | 61.0 | 54.0 | – | 56.0 |
| Al$_2$O$_3$ | 7.0 | – | 17.5 | 10.0 | – | 16.5 |
| B$_2$O$_3$ | 2.0 | – | 6.1 | 2.0 | – | 3.5 |
| Li$_2$O | 0 | – | 1.0 | 0 | – | 1.0 |
| Na$_2$O | 12.0 | – | 15.0 | 12.0 | – | 15.0 |
| K$_2$O | 2.5 | – | 3.5 | 3.0 | – | 3.5 |
| CaO | 0 | – | 4.1 | 0 | – | 1.0 |
| BaO | 0 | – | 0.3 | 0 | – | 0.3 |
| ZnO | 5.0 | – | 10.0 | 8.0 | – | 10.0 |
| PbO | 0 | – | 0.5 | 0 | – | 0.5 |
| TiO$_2$ | 0.1 | – | 0.9 | 0.6 | – | 0.9 |
| As$_2$O$_3$ | 0 | – | 0.5 | 0 | – | 0.5 |
| Sb$_2$O$_3$ | 0 | – | 1.0 | 0 | – | 1.0 |

The sum of the alkali metal oxides is preferably 14.3 to 18.0% by weight; the sum of CaO, BaO and ZnO is preferably smaller than 10 and larger than 6.3% by weight. As$_2$O$_3$ and Sb$_2$O$_3$ can alternatively be used for the refining either in admixture or preferably individually.

Chemical hardening of the above glass compositions is effected according to this invention by immersion of a glass specimen into a molten salt bath for a period of time sufficient to permit the exchange of a portion of the small alkali metal ions in the glass composition with larger alkali metal ions which diffuse from the molten salt bath into the glass surface. The relative size of the alkali metal ions is Cs>Rb>K>Na>Li.

Ion exchange with molten potassium nitrate is preferred because potassium nitrate melts at about 334° C. which is sufficiently below the glass transformation temperature and upper cooling temperature of the glass composition so that the cooling of the melt which takes place on immersion does not cause crystallization of the molten salt. Other inorganic alkali metal salts having melting points at least 50°– 150° C. below the glass transformation temperature and which are stable at hardening temperatures can be used equivalently provided that the cation is larger than that being exchanged in the glass.

The following test hardening operations were carried out on glasses in the above range of compositions. The glass specimens were preheated to the desired hardening temperature in a hardening furnace and then immersed in a salt bath at the hardening temperature. The salt bath consisted of molten potassium nitrate. After the hardening process at various times and temperatures, the glasses were removed from the bath, introduced into kieselguhr for cooling purposes and thereafter washed off in water.

The optical measurements as regards tension were made on 0.5 mm thick cross-sections of the chemically hardened glass parts. These cross-sections were situated perpendicular to the glass surface which had been exposed to the potassium nitrate exchange medium. A tension value established by optical tension procedures and generally lower than 20% as compared with the flexural tensile strength can already be attributed to tension relaxations in the production of the thin specimens. This discrepancy increases with rising flexural tensile strengths.

The layer thickness of the compressive or tensile stress zone was determined by the procedure of locating the neutral phase, as is known in the art. This layer thickness must not be identical with the diffusion front.

The flexural tension tests were made with a 50 mm. diameter annular support on circular discs having a diameter of 60 mm. Before conducting the flexural tensile stress test, the chemically hardened glasses were subjected to slight roughening by abrasion with grade 600 emery.

The ball-dropping test was carried out according to DIN 4646 with a dropping height of 130 cm. and a ball weight of 43.8 p. The standard support was used in all cases and the glasses were likewise slightly roughened with 600 grade emery prior to the test. If the discs were not destroyed in this test, the dropping height was increased in stages until breaking occurred. The dropping load in cmkp was used for evaluating the impact strength.

It had originally been assumed that a new glass specimen would have to be taken for each individual ball-dropping test. However, a comparison of glass specimens which had repeatedly been pre-loaded with specimens which were not pre-loaded showed another picture. The ball-dropping test appears to indicate that pre-loading of the specimens occurs only to an extent which does not deepen the indentation fissures, since it appears that compressive stress zones produced by chemical hardening not only take up the tangential tensile load, but also retard the deepening of the fissures. This discovery is of particular interest for repeated alternate stressing of chemically hardened optical glasses in practice.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated all parts and percentages are by weight.

Table 1 gives a number of examples of compositions by synthesis in percentages by weight and Table 2 sets forth the measured properties of these compositions.

It can be seen from Tables 1 and 2 that only glasses III, V, VII and VIII possess suitable refractive index values for use in the present invention, and that the former two of these have glass transformation temperatures outside of the suitable ranges therefor, while Examples VII and VIII possess both properties within the desired ranges.

EXAMPLE 1

127.25 g. quartz sand, 15.75 g. boric acid, 55.46 g. soda, 11.90 g. sodium nitrate, 11.94 g. calcined potash, 23.04 g. zinc oxide, 56.91 g. aluminum monohydrate, 2.04 g. powdered rutile, 0.75 g. arsenic and 0.94 g. common salt are intimately admixed, placed in a ceramic crucible, and introduced into an electric furnace at 1470° C.

After melting this batch, refining takes place for 2 hours, following by stirring with a quartz tube and lowering the temperature to 1450° C. Refining is thereafter continued at 1450° C. for 2 hours without stirring, whereafter the melt is cooled to 1200° C. while stirring and then removed from the furnace. The glass melt is poured into a metal mold and introduced into a cooling furnace at 580° C. In this furnace, the glass specimen is cooled to room temperature at a cooling rate of 30° per hour. A glass is produced with a refractive index $n_d$ of 1.52310. The Abbe number $\gamma_d$ is 56.62; the $n_F$ value is 1.5300 and the $n_C$ value is 1.52074. The expansion of this glass is at 87.5 and the $T_{K100}$ value is 142. The processing temperature ($10^4$ poises) is at 1072° C., the softening temperature ($10^{7.6}$ poises) at 737° C., the upper cooling temperature ($10^{13}$ poises) at 552° C., the lower cooling temperature ($10^{14.5}$ poises) at 513° C., and the transformation temperature according to DIN is at 536° C. The electric conductivity of this glass at 20° C. is $1.2 \times 10^{12}$ OHM, at 250° C. is $1.1 \times 10^6$ OHM,

TABLE 1

| COMPO-NENTS | GLASS I | GLASS II | GLASS III | GLASS IV | GLASS V | GLASS VI | GLASS VII | GLASS VIII | GLASS IX |
|---|---|---|---|---|---|---|---|---|---|
| $SiO_2$ | 50.52 | 51.32 | 50.89 | 55.89 | 60.96 | 50.81 | 50.81 | 56.22 | 52.18 |
| $Al_2O_3$ | 17.18 | 17.45 | 17.45 | 14.26 | 7.11 | 17.28 | 17.28 | 12.11 | 17.66 |
| $B_2O_3$ | 6.06 | 4.10 | 3.58 | 3.19 | 4.06 | 4.07 | 4.07 | 4.04 | 2.07 |
| $Li_2O$ | 0.80 | — | — | 0.21 | — | — | — | — | — |
| $Na_2O$ | 12.29 | 13.47 | 13.09 | 13.82 | 14.33 | 14.33 | 14.33 | 14.22 | 14.36 |
| $K_2O$ | 2.80 | 3.28 | 3.32 | 3.09 | 3.25 | 3.25 | 3.25 | 3.23 | 2.56 |
| CaO | — | — | 0.20 | — | 2.03 | 2.03 | 4.07 | 4.01 | 3.31 |
| BaO | — | — | — | 0.21 | — | — | — | — | — |
| PbO | — | — | — | 0.41 | — | — | — | — | — |
| $TiO_2$ | 0.10 | 0.82 | 0.70 | 0.62 | 0.81 | 0.81 | 0.81 | 0.81 | 0.83 |
| ZnO | 9.19 | 9.24 | 9.28 | 8.24 | 7.11 | 7.11 | 5.08 | 5.01 | 6.71 |
| $As_2O_3$ | 0.26 | — | — | 0.31 | 0.30 | 0.30 | 0.30 | 0.30 | 0.30 |
| $Sb_2O_3$ | — | 0.30 | 0.50 | — | — | — | — | — | — | and at 350° C. is $5.0 \times 10^4$ OHM. The acid resistivity of this glass lies in acid class 3; the alkali resistivity is in

TABLE 2

| PROPERTIES | GLASS I | GLASS II | GLASS III | GLASS IV | GLASS V | GLASS VI | GLASS VII | GLASS VIII | GLASS IX |
|---|---|---|---|---|---|---|---|---|---|
| $20,300 \times 10^{-7}$ °C. | 91.2 | 97.2 | 92.1 | 91.9 | 96.0 | 96.4 | 97.3 | 97.0 | 96.5 |
| Fusion stress compared with BaF 51 (nm/cm) | −338/ +334 | −50/ +33 | −219/ +219 | +223/ −230 | +175/ −159 | +124 −132 | +52 −54 | +73 −81 | −79 +87 |
| $n_d$ | 1.52149 | 1.5238 | 1.5232 | 1.5220 | 1.5233 | 1.5268 | 1.5232 | 1.5233 | 1.5289 |
| $v_d$ | 57.18 | 56.57 | 56.71 | | | | | | |
| Transformation temp. (°C) | 472 | 536 | 463 | 498 | 468 | 498 | 483 | 512 | 547 |
| Softening temp. (°C) | 700 | 740 | 690 | 720 | 695 | 710 | 700 | 720 | 750 |
| Flexural tensile strength after 2 hr. hardening time Abrasion with grade 600 emery | 3000 | 3000 | 5000 | 4000 | 3500 | 4000 | 3000 | 3500 | 4000 |
| 4 hr. hardening time | 5000 | 4500 | 7000 | 5000 | 5000 | 4000 | 4000 | 5000 | 5500 |
| 16 hr. hardening time | 2500 | 3000 | 4000 | 4000 | 2500 | 3000 | 2500 | 3000 | 3500 |
| Ball-dropping test ac. to DIN 4646 (Dropping load in kp) | 15.6 | 17.5 | 12.0 | 10.0 | 10.6 | 8.8 | 11.3 | 10.6 | 12.0 |
| Thickness of compressive stress zone in ($\mu m$)[+] | 60 | 80 | 80 | 70 | 50 | 60 | 30 | 50 | 30 |
| Compressive stress obtaining in compressive stress zone ($nm^+/cm^{++}$) | 4100 | 2800 | 3900 | 3700 | 3100 | 3200 | 3000 | 3200 | 3000 |
| Tensile stress obtaining in tensile stress zone[+][++] (nm/cm) | 300 | 190 | 240 | 280 | 200 | 220 | 180 | 210 | 180 |

[+]Data for a typical hardening $KNO_3$ salt melt, 90° transf. temp. and 4 hr. exchange time.
[++]Measurements made on 0.5 mm. thick cross-sections.

caustic solution class 3; the hydrolytic stability is in hydrolytic class 3, measured according to DIN 52; 322; 12,116 and 12,111, respectively. The fusion stress was determined as compared with the standard glass BaF 51 by melting a specimen of the glass with the BaF 51 standard glass in an electric furnace at 730° C., thereafter cooling at 10° per hour to room temperature and measuring the fusion zone under a polarizing microscope. A fusion stress of 40 nm/cm pressure was measured in the standard glass BaF 51 and 38 nm/cm tension in the specimen glass.

Other hardening tests carried out on glasses with the glass composition II (see Table 1) showed the following strength values determined by the ball-dropping test: glass thickness 2 mm, treated beforehand with grade 600 emery.

TABLE 3

| HARDENING CONDITIONS | | DROPPING LOAD |
|---|---|---|
| Time hrs. | Temperature °C | cm kp |
| 0 | 0 | 1.1 |
| 1 | 460 | 27.7 |
| 1 | 480 | 20.8 |
| 1 | 500 | 15.6 |
| 2 | 380 | 7.7 |
| 2 | 440 | 15.6 |
| 2 | 460 | 15.8 |
| 2 | 480 | 9.0 |
| 2 | 500 | 13.7 |
| 4 | 460 | 17.5 |
| 4 | 480 | 13.8 |
| 4 | 500 | 12.0 |
| 6 | 420 | 13.6 |
| 6 | 440 | 19.0 |
| 6 | 460 | 17.5 |
| 6 | 480 | 13.8 |
| 16 | 420 | 9.0 |
| 16 | 440 | 13.8 |
| 16 | 460 | 22.3 |

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A chemically hardened optical crown glass having a sharp U-form tension profile, a refractive index $n_d$ of 1.5225–1.5235, a thermal expansion coefficient in the temperature range between 20° C. and 300° C. of $90 \times 10^{-7}$ to $100 \times 10^{-7}/°$ C., a dispersion $\gamma d$ of 54–60, a softening temperature of 690°–750° C., a transformation temperature of 480°–550° C., and a flexural tensile strength of at least 3000 kp/cm² produced by melting, shaping and cooling a batch consisting essentially of the following composition in parts by weight based on 100 parts of total composition wherein the sum of the alkali oxides in the composition amounts to 14.5–18.0% by weight, and wherein the sum of CaO, BaO and ZnO is larger than 6.3 and smaller than 10% by weight:

| | | | |
|---|---|---|---|
| SiO₂ | 50.5 | – | 61.0 |
| Al₂O₃ | 7.0 | – | 17.5 |
| B₂O₃ | 2.0 | – | 6.1 |
| Li₂O | 0 | – | 1.0 |
| Na₂O | 12.0 | – | 15.0 |
| K₂O | 2.5 | – | 3.5 |
| CaO | 0 | – | 4.1 |
| BaO | 0 | – | 0.3 |
| ZnO | 5.0 | – | 10.0 |
| PbO | 0 | – | 0.5 |
| TiO₂ | 0.1 | – | 0.9 |
| As₂O₃ | 0 | – | 0.5 |
| Sb₂O₃ | 0 | – | 1.0 | and thereafter subjecting it to an ion exchange in which potassium, rubidium or cesium ions are diffused into the glass in exchange for smaller alkali metal ions at a temperature below the upper cooling temperature which corresponds to a viscosity of $10^{13}$ poises.

2. An optical crown glass according to claim 1 wherein said ion exchange is effected after the glass has been ground and polished to its final form.

3. An optical crown glass according to claim 2 wherein said diffused ions are potassium ions.

4. An optical crown glass according to claim 2 wherein said final form is an eyeglass lens.

5. An optical crown glass according to claim 4 wherein said diffused ions are potassium ions.

6. An optical crown glass according to claim 1, wherein said batch has the following composition in parts by weight based on 100 parts of total composition:

| | | | |
|---|---|---|---|
| SiO₂ | 54.0 | – | 56.0 |
| Al₂O₃ | 10.0 | – | 16.5 |
| B₂O₃ | 2.0 | – | 3.5 |
| Li₂O | 0 | – | 1.0 |
| Na₂O | 12.0 | – | 15.0 |
| K₂O | 3.0 | – | 3.5 |
| CaO | 0 | – | 1.0 |
| BaO | 0 | – | 0.3 |
| ZnO | 8.0 | – | 10.0 |
| PbO | 0 | – | 0.5 |
| TiO₂ | 0.6 | – | 0.9 |
| As₂O₃ | 0 | – | 0.5 |
| Sb₂O₃ | 0 | – | 1.0. |

7. A chemically hardened optical crown glass according to claim 1, consisting essentially of, in weight percent based on the total composition, 50.81%, SiO₂; 17.28% Al₂O₃; 4.07% B₂O₃; 14.33% Na₂O; 3.25% K₂O; 4.07% CaO; 0.81% TiO₂; 5.08% ZnO; and 0.30% As₂O₃.

8. A chemically hardened optical crown glass according to claim 1, consisting essentially of, in weight percent based on the total composition, 56.22% SiO₂; 12.11% Al₂O₃; 4.04% B₂O₃; 14.22% Na₂O; 3.23% K₂O; 4.01% CaO; 0.81% TiO₂; 5.08% ZnO; and 0.30% As₂O₃.

9. A glass consisting essentially of the following composition and in parts by weight based on 100 parts of total composition: SiO₂, 50.5–61.0; Al₂O₃, 7.0–17.5; B₂O₃, 2.0–6.1; Bi₂O, 0–1.0; Na₂O, 12.0–15.0; K₂O, 2.5–3.5; CaO, 0–4.1; BaO, 0–0.3; ZnO, 5.0–10.0; PbO, 0–0.5; TiO₂, 0.1–0.9; As₂O₃, 0–0.5; and Sb₂O₃, 0–1.0.

10. A glass composition according to claim 9, consisting essentially of the following components in parts by weight based on 100 parts of total composition:

| | | | |
|---|---|---|---|
| SiO₂ | 54.0 | – | 56.0 |
| Al₂O₃ | 10.0 | – | 16.5 |
| B₂O₃ | 2.0 | – | 3.5 |
| Li₂O | 0 | – | 1.0 |
| Na₂O | 12.0 | – | 15.0 |
| K₂O | 3.0 | – | 3.5 |
| CaO | 0 | – | 1.0 |
| BaO | 0 | – | 0.3 |
| ZnO | 8.0 | – | 10.0 |
| PbO | 0 | – | 0.5 |
| TiO₂ | 0.6 | – | 0.9 |
| As₂O₃ | 0 | – | 0.5 |
| Sb₂O₃ | 0 | – | 1.0. |

* * * * *